United States Patent [19]
Brkovic et al.

[11] Patent Number: 5,954,217
[45] Date of Patent: Sep. 21, 1999

[54] PACKAGING CONTAINER AND METHOD OF MANUFACTURING THE SAME

[75] Inventors: Rista Brkovic, Darmstadt, Germany; Masamichi Kaneko, Tokyo, Japan; Hidetoshi Konno, Yokohama, Japan; Junichi Satoyoshi, Tokyo, Japan

[73] Assignee: Tetra Laval Holdings & Finance, S.A., Switzerland

[21] Appl. No.: 08/952,166

[22] PCT Filed: May 10, 1996

[86] PCT No.: PCT/JP96/01239

§ 371 Date: Nov. 6, 1997

§ 102(e) Date: Nov. 6, 1997

[87] PCT Pub. No.: WO96/35618

PCT Pub. Date: Nov. 14, 1996

[30] Foreign Application Priority Data

May 10, 1995 [JP] Japan .................................. 7-111957

[51] Int. Cl.$^6$ .................................................. B65D 25/14
[52] U.S. Cl. .................................... 220/62.13; 220/62.22; 220/62.2; 215/12.1
[58] Field of Search ................. 220/62.2, 62.22, 220/62.21, 62.12, 62.13, 592.2, 592.26; 215/12.2, 12.1

[56] References Cited

U.S. PATENT DOCUMENTS

| | | | |
|---|---|---|---|
| 3,401,475 | 9/1968 | Morehouse et al. | 40/306 |
| 3,468,224 | 9/1969 | Rausing et al. | 93/36.01 |
| 3,578,194 | 5/1971 | Cornelius | 215/12.2 |
| 3,662,944 | 5/1972 | Joostem, Sr. | 220/62.2 |
| 3,799,423 | 3/1974 | Cvacho | 220/62.12 |
| 4,281,769 | 8/1981 | Ignell | 215/12.2 |
| 4,342,183 | 8/1982 | Gordon et al. | 53/433 |
| 4,342,399 | 8/1982 | Stirling | 215/12.2 |
| 4,595,112 | 6/1986 | Dubois | 220/592.26 |
| 4,645,695 | 2/1987 | Negi et al. | 220/62.22 |
| 4,997,125 | 3/1991 | Glerum | 229/4.5 |
| 5,256,427 | 10/1993 | Quick et al. | 220/62.13 |

FOREIGN PATENT DOCUMENTS

| | | |
|---|---|---|
| 59-109615 | 7/1984 | Japan . |
| 59-209532 | 11/1984 | Japan . |
| 60-35010 | 3/1985 | Japan . |
| 63-3950 | 1/1988 | Japan . |
| 5-85350 | 12/1993 | Japan . |
| 06134849 | 5/1994 | Japan . |
| 07061434 | 3/1995 | Japan . |
| 7-13717 | 3/1995 | Japan . |

OTHER PUBLICATIONS

Search Report for PCT/JP96/01239 (Translates all of Japanese references), Jun. 1996.

*Primary Examiner*—Stephen Castellano
*Attorney, Agent, or Firm*—Lorusso & Loud

[57] ABSTRACT

An object is to provide a packaging container which can be easily recycled after being thrown away, which allows food to be heated by dielectric heating, and which has an excellent thermal insulating performance. Another object is to provide a method for manufacturing the packaging container. The packaging container includes a sleeve (12) having upper and lower ends folded inward, a film (16) which covers the sleeve (12), an inner container (11) formed inside the sleeve (12), and a lid for sealing the inner container (11). The film (16) and the inner container (11) are fused and joined integrally at folded portions of the upper and lower ends of the sleeve (12). Since it becomes unnecessary to provide a thermally activatable adhesive or the like between the sleeve (12) and the inner container (11), or to apply a thermally activatable adhesive or the like onto the inner surface of the sleeve (12), storage and handling of the sleeve (12) become easier.

12 Claims, 8 Drawing Sheets

PACKAGING CONTAINER AND METHOD OF MANUFACTURING THE SAME

TECHNICAL FIELD

The present invention relates to a packaging container and a method for manufacturing the same.

BACKGROUND ART

Conventionally, bottles, paper containers, metallic cans, etc., have been used as packaging containers for holding foods such as liquid foods. These packaging containers are sealed after predetermined amounts of liquid foods are charged therein, and are then sold.

Of these package containers, bottles are not suitable for sale using vending machines because they are weak against impacts and are easily broken. Although paper containers are suitable for sale using vending machines because they are not broken by impacts, their flexibility is too high. Therefore, when a paper container is opened, it may be deformed so that liquid food held therein flows out from the spout of the container.

In contrast, metallic cans are suitable for sale using vending machines because they are strong against impacts and have a sufficient stiffness.

However, conventional metallic cans have problems that a difficulty exists in crushing thrown-away empty cans, and that laborious work is needed to separately collect aluminum cans and steel cans. Moreover, even when steel cans, aluminum cans, and the like having a reduced wall thickness are used, there is a limit in reducing their weights. Therefore, costs involved in distribution increase.

In the case where liquid foods are sold by a vending machine after being heated therein, metallic cans must be indirectly heated using hot air, because metallic cans cannot be directly heated by dielectric heating. Accordingly, it takes a prolonged time to heat liquid foods to a proper temperature. In addition, due to the poor thermal insulating performance of metallic cans, a metallic can cannot be held by hand immediately after being taken out from a vending machine. Also, liquid food held therein gets cold in a short period of time.

In view of the foregoing problems of conventional packaging containers, it is an object of the present invention to provide a packaging container which can be easily recycled after being thrown away, which allows food to be heated by dielectric heating, and which has an excellent thermal insulating performance. Another object of the present invention is to provide a method for manufacturing the package container as set forth above.

DISCLOSURE OF THE INVENTION

To achieve the above objects, a packaging container according to the present invention comprises a sleeve having upper and lower ends folded inward, a film which covers the sleeve, an inner container formed inside the sleeve, and a lid for sealing the inner container.

The film and the inner container are fused and joined integrally at folded portions of the upper and lower ends of the sleeve.

In this case, it becomes unnecessary to provide a thermally activatable adhesive or the like between the sleeve and the inner container, or to apply a thermally activatable adhesive or the like onto the inner surface of the sleeve. This facilitates storage and handling of the sleeve.

Since a material other than the film, for example, a paper substrate contacts the outermost layer of the inner container in an area other than the upper and lower ends of the sleeve, the inner container and the sleeve are not joined by fusion and maintained separated from each other.

Accordingly, when the internal pressure decreases due to cooling of a hot food charged into the packaging container, only the inner container deforms to absorb the pressure decrease, thereby preventing the sleeve from deforming. As a result, it becomes possible to set the strength of the sleeve to a minimum value required for transportation or use of the packaging container. This makes it possible to reduce costs by decreasing the wall thickness of the packaging container.

Also, it becomes easier to crush the packaging container after being thrown away, and to collect the packaging container.

Further, since the packaging container can be directly heated by dielectric heating in the case where food held in the packaging container is heated in a vending machine before being sold, the time required to heat the food to a sufficient temperature can be shortened. Moreover, since the thermal insulating performance can be increased through use of a paper substrate or the like, the packaging container can be held by hand even immediately after being taken out from a vending machine, and the food held therein is prevented from quickly getting cold.

Another packaging container according to the present invention comprises a sleeve, a film which covers the sleeve, an inner container formed inside the sleeve, and a lid for sealing the inner container.

The sleeve and the inner container are fused and joined integrally.

In this case, it becomes unnecessary to provide a thermally activatable adhesive or the like between the sleeve and the inner container, or to apply a thermally activatable adhesive or the like onto the inner surface of the sleeve. This facilitates storage and handling of the sleeve.

Also, it becomes easier to crush the packaging container after being thrown away, and to collect the packaging container.

Further, since the packaging container can be directly heated by dielectric heating in the case where food held in the packaging container is heated in a vending machine before being sold, the time required to heat the food to a sufficient temperature can be shortened. Moreover, since the thermal insulating performance can be increased through use of a foamed material, the packaging container can be held by hand even immediately after being taken out from a vending machine, and the food held therein is prevented from quickly getting cold.

In still another packaging container according to the present invention, the film is formed of a laminated film having a gas barrier layer.

In still another packaging container according to the present invention, the inner container is formed of a laminated sheet having a gas barrier layer.

In still another packaging container according to the present invention, the film is formed of a laminated film having a gas barrier layer, while the inner container is formed of a laminated sheet having a gas barrier layer, wherein the outermost layer of the laminated film is made of a resin compatible with a resin constituting the outermost layer of the laminated sheet.

In this case, the ratio of the gas barrier layer within the laminated sheet constituting the inner container can be reduced by the amount of the gas barrier layer formed in the laminated film constituting the film, thereby reducing the thickness of the laminated sheet.

Accordingly, the cost of the packaging container can be decreased. Further, since the amount of a gas barrier material, which is contained in recycle waste produced during trimming, is decreased by an amount corresponding to the decrease in the ratio of the gas barrier layer, extrusion can be performed stably during co-extrusion molding.

In still another packaging container according to the present invention, the film is formed of a laminated film having a gas barrier layer, while the inner container is formed of a laminated sheet having a gas barrier layer, wherein the sleeve is made of a foamed resin compatible with a resin constituting the outermost layer of the laminated sheet.

In this case, the ratio of the gas barrier layer within the laminated sheet constituting the inner container can be reduced by the amount of the gas barrier layer formed in the laminated film constituting the film, thereby reducing the thickness of the laminated sheet.

Accordingly, the cost of the packaging container can be decreased. Further, since the amount of a gas barrier material, which is contained in recycle waste produced during trimming, is decreased by an amount corresponding to the decrease in the ratio of the gas barrier layer, extrusion can be performed stably during co-extrusion molding.

In still another packaging container according to the present invention, the resin constituting the outermost layer of the laminated sheet and the outermost layer of the laminated film is polypropylene, and the resin constituting the gas barrier layer of the laminated sheet and the gas barrier layer of the laminated film is ethylene vinyl alcohol copolymer.

In this case, since the melting point of the ethylene vinyl alcohol copolymer is higher than that of the polypropylene, the laminated sheet is supported by a layer made of the ethylene vinyl alcohol copolymer. Accordingly, the laminated sheet can be heated to a high temperature. Also, since the inner container is formed in a state in which the inner container has a large amount of heat, the inner container and the sleeve can be fused and joined in an improved manner.

In a method for manufacturing a packaging container according to the present invention, a sleeve made of a paper substrate is covered with a film, and the upper and lower ends of the sleeve are folded inward. The sleeve is then inserted into a forming die, and an inner container is formed within the sleeve by using a forward-end expansion method. Due to heat applied during the forming process, the upper and lower ends of the sleeve and the inner container are fused and joined integrally. A food is then charged into the inner container, and the inner container is sealed with a lid.

In this case, since the inner container is formed within the sleeve, the heat, which is applied to the laminated sheet during the forming process using the forward-end expansion method, is prevented from escaping to the forming die.

In the forward-end expansion method, the laminated sheet undergoes forming after being heated to a temperature equal to or higher than the melting point. This eliminates the necessity of sterilizing the inner container before charging a food. Further, there is no possibility that the inner container contracts or deforms due to molecular orientation effect during retorting. Moreover, use of the forward-end expansion method facilities adjustment of the thickness of the inner container.

In another method for manufacturing a packaging container according to the present invention, a sleeve is covered with a film. The sleeve is then inserted into a forming die, and an inner container is formed within the sleeve by using a forward-end expansion method. Due to heat applied during the forming process, the sleeve and the inner container are fused and joined integrally. A food is then charged into the inner container, and the inner container is sealed with a lid.

In this case, since the inner container is formed within the sleeve, the heat, which is applied to the laminated sheet during the forming process using the forward-end expansion method, is prevented from escaping to the forming die.

In the forward-end expansion method, the laminated sheet undergoes forming after being heated to a temperature equal to or higher than the melting point. This eliminates the necessity of sterilizing the inner container before charging a food. Further, there is no possibility that the inner container contracts or deforms due to molecular orientation effect during retorting. Moreover, use of the forward-end expansion method facilities adjustment of the thickness of the inner container.

In still another method for manufacturing a packaging container according to the present invention, the film is formed of a laminated film having a gas barrier layer.

In still another method for manufacturing a packaging container according to the present invention, the inner container is formed of a laminated sheet having a gas barrier layer.

In still another method for manufacturing a packaging container according to the present invention, the film is formed of a laminated film having a gas barrier layer, while the inner container is formed of a laminated sheet having a gas barrier layer, wherein the outermost layer of the laminated film is made of a resin compatible with a resin constituting the outermost layer of the laminated sheet.

In this case, the ratio of the gas barrier layer within the laminated sheet constituting the inner container can be reduced by the amount of the gas barrier layer formed in the laminated film constituting the film, thereby reducing the thickness of the laminated sheet.

Accordingly, the cost of the packaging container can be decreased. Further, since the amount of a gas barrier material, which is contained in recycle waste produced during trimming, is decreased by an amount corresponding to the decrease in the ratio of the gas barrier layer, extrusion can be performed stably during co-extrusion molding.

In still another method for manufacturing a packaging container according to the present invention, the film is formed of a laminated film having a gas barrier layer, while the inner container is formed of a laminated sheet having a gas barrier layer, wherein the sleeve is made of a foamed resin compatible with a resin constituting the outermost layer of the laminated sheet.

In this case, the ratio of the gas barrier layer within the laminated sheet constituting the inner container can be reduced by the amount of the gas barrier layer formed in the laminated film constituting the film, thereby reducing the thickness of the laminated sheet.

Accordingly, the cost of the packaging container can be decreased. Further, since the amount of a gas barrier material, which is contained in recycle waste produced during trimming, is decreased by an amount corresponding to the decrease in the ratio of the gas barrier layer, extrusion can be performed stably during co-extrusion molding.

In still another method for manufacturing a packaging container according to the present invention, the resin constituting the outermost layer of the laminated sheet and the outermost layer of the laminated film is polypropylene, and the resin constituting the gas barrier layer of the laminated sheet and the gas barrier layer of the laminated film is ethylene vinyl alcohol copolymer.

In this case, since the melting point of the ethylene vinyl alcohol copolymer is higher than that of the polypropylene, the laminated sheet is supported by a layer made of the ethylene vinyl alcohol copolymer. Accordingly, the laminated sheet can be heated to a high temperature. Also, since the inner container is formed in a state in which the inner container has a large amount of heat, the inner container and the sleeve can be fused and joined in an improved manner.

BEST MODE FOR CARRYING OUT THE INVENTION

Embodiments of the present invention will now be described in more detail with reference to the accompanying drawings.

Figure 1:
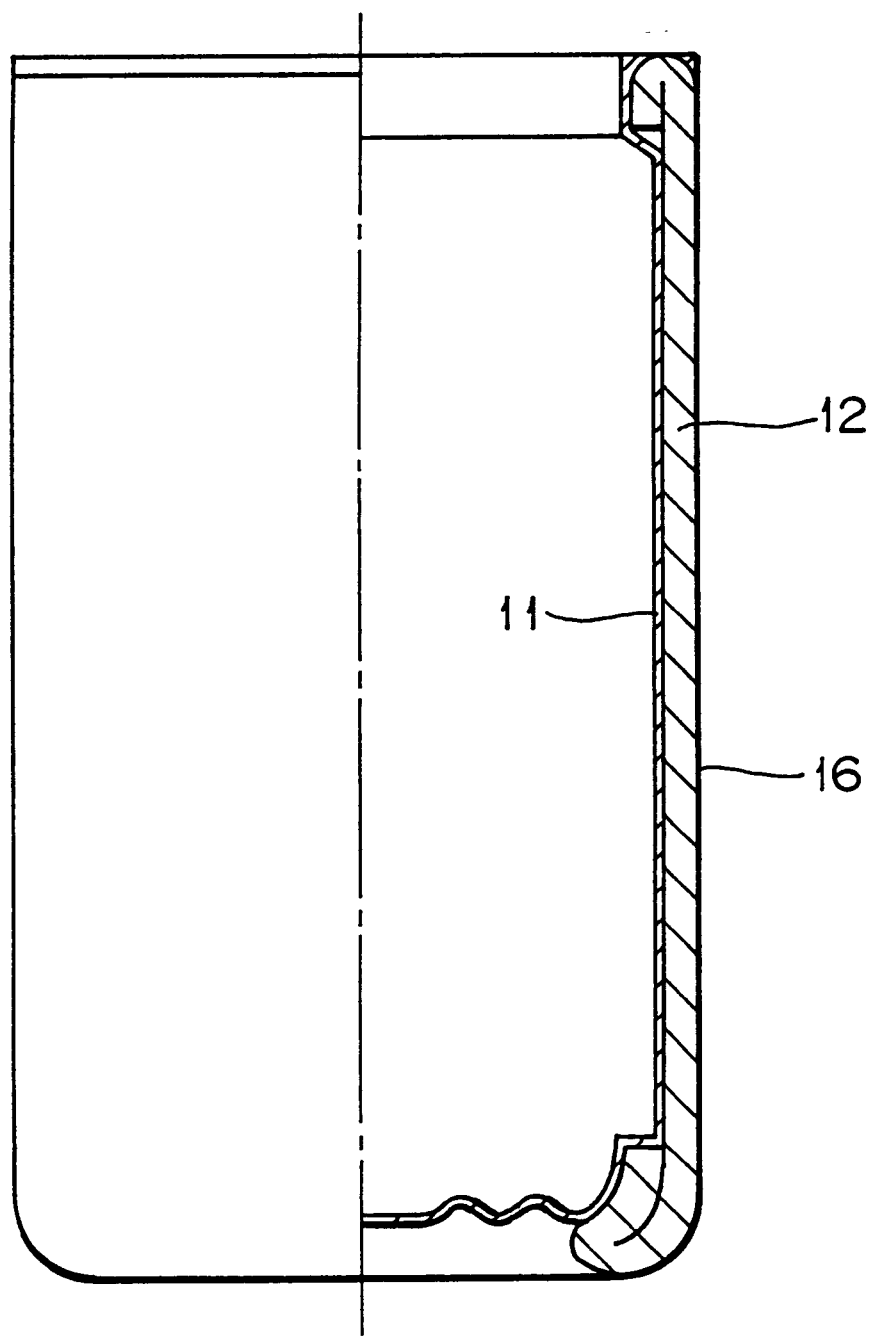
FIG. 1 is a partially sectioned view of a packaging container according to a first embodiment of the present invention.
Figure 2:
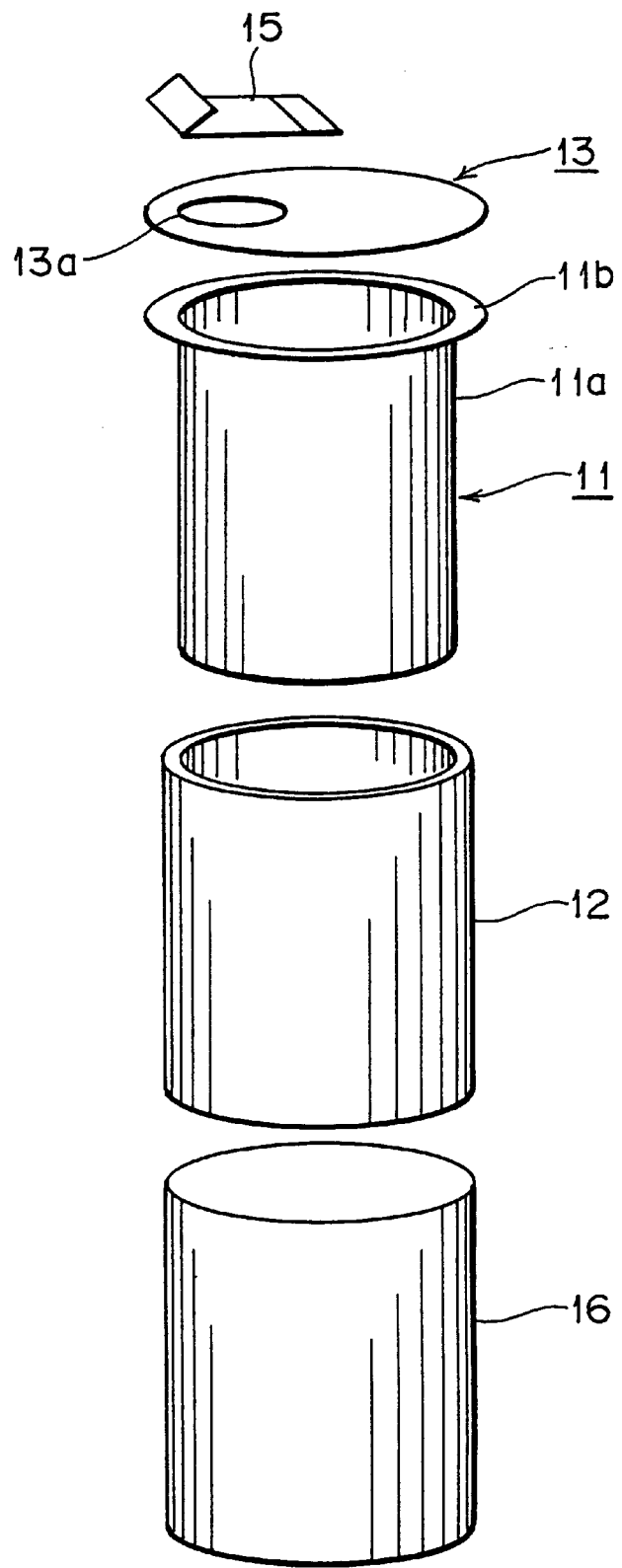
FIG. 2 is an exploded perspective view of the packaging container according to the first embodiment of the present invention.
Figure 3:
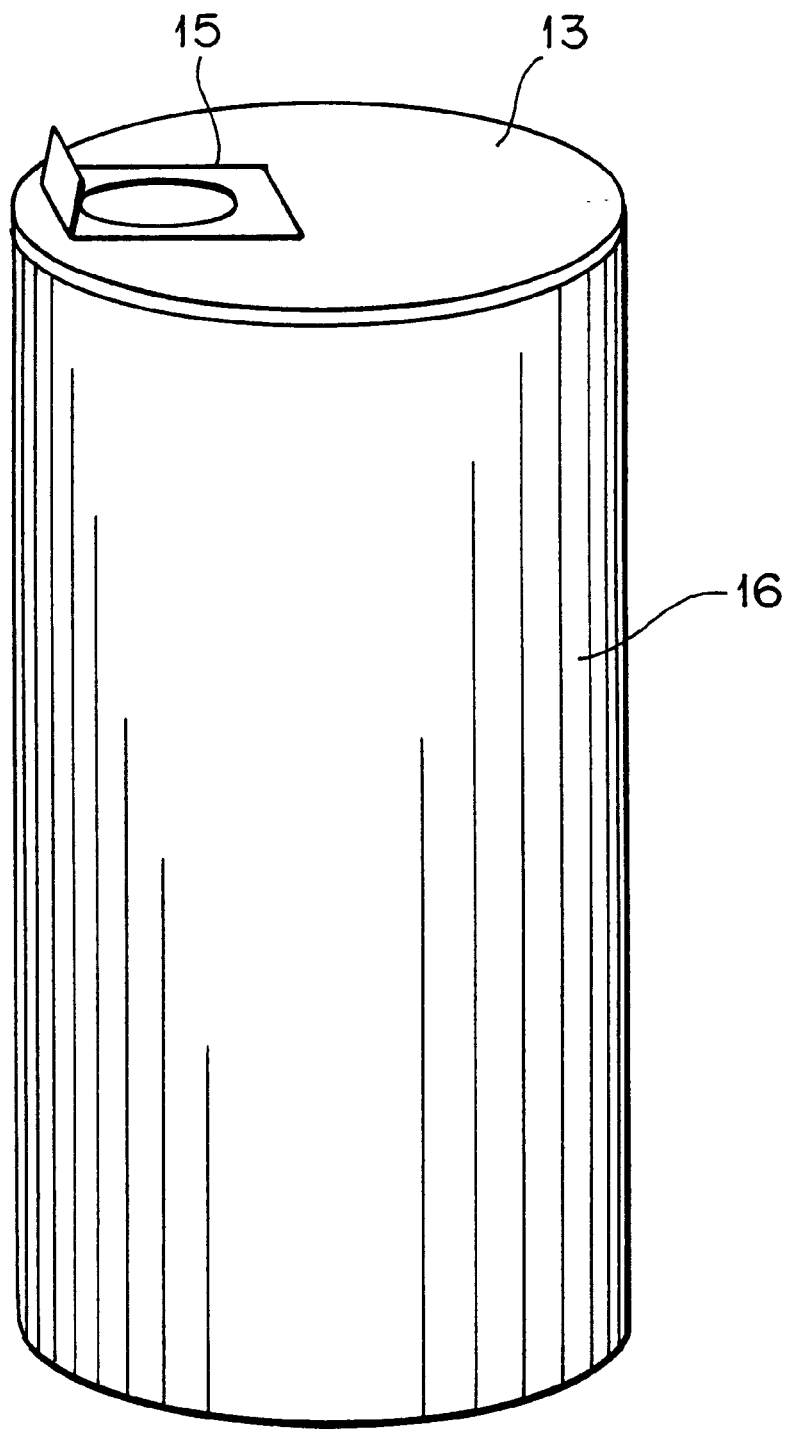
FIG. 3 is a perspective view of the packaging container according to the first embodiment of the present invention.
Figure 4:
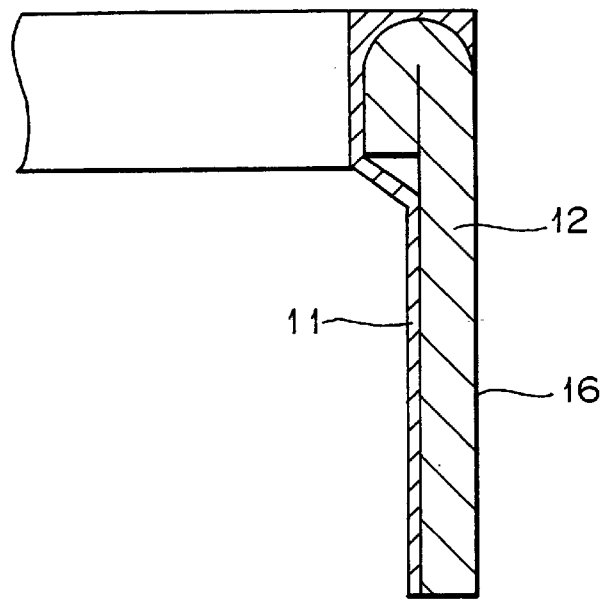
FIG. 4 is a sectional view of the flange portion and its neighboring portion of the packaging container according to the first embodiment of the present invention.
Figure 5:
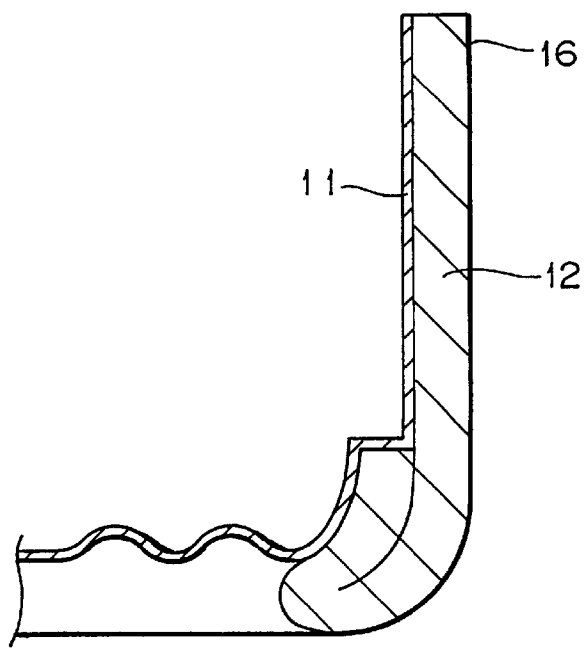
FIG. 5 is a sectional view of the bottom portion and its neighboring portion of the packaging container according to the first embodiment of the present invention.

FIG. 1 is a partially sectioned view of a packaging container according to a first embodiment of the present invention, FIG. 2 is an exploded perspective view of the packaging container according to the first embodiment of the present invention, FIG. 3 is a perspective view of the packaging container according to the first embodiment of the present invention, FIG. 4 is a sectional view of the flange portion and its neighboring portion of the packaging container according to the first embodiment of the present invention, and FIG. 5 is a sectional view of the bottom portion and its neighboring portion of the packaging container according to the first embodiment of the present invention.

In these drawings, numeral 11 denotes an inner container which is made of a transparent thermoplastic resin having a high gas barrier performance and which holds a food such as a liquid food. The inner container 11 has a cup-like shape having an opening at its upper end. The inner container 11 is made of a laminated resin sheet which is formed using a co-extrusion method, a blown film forming method or the like, and is formed into a cup-like shape using a forward-end expansion method (melt phase pressure air forming method). The inner container 11 thus formed is composed of a cylindrical body portion 11a having a bottom, and a flange portion 11b extending radially outward from the upper end of the body portion 11a.

In the present embodiment, the inner container 11 has an outer diameter of approximately 53 mm and a height of approximately 135 mm. The body portion 11a of the inner container 11 has a thickness of approximately 150 $\mu$m and the bottom wall of the inner container 11 has a thickness of 350 $\mu$m.

In the above-described forward-end expansion method, the laminated sheet is formed after being heated to a temperature of approximately 180° C., which is above the melting point. Therefore, the inner container 11 does not need to be sterilized before being filled with liquid food. The inner container 11 does not contract or deform due to molecular orientation effect during a retorting process. Further, when using this method, it becomes easier to adjust the thickness of the inner container 11.

The laminated sheet has a layer of polypropylene (hereinafter referred to as "PP") on at least one of the outer surfaces thereof and also has a layer of ethylene vinyl alcohol copolymer (hereinafter referred to as "EVOH"). For example, the laminated sheet has the following layered structure:
PP layer/adhesive layer/EVOH layer/adhesive layer/PP layer.

Alternatively, the following layered structure may be employed:
PP layer/EVOH layer/PP layer.
Since an EVOH layer is included in the layered structure as a gas barrier layer, the gas barrier performance of the laminated sheet can be increased.

In the present embodiment, the laminated sheet has a thickness of 2.5 mm. When the laminated sheet is formed into a cup-like shape using the forward-end expansion method, the thickness of the body portion 11a becomes approximately 150 $\mu$m. The above-mentioned PP layer becomes the outermost layer when the laminated sheet is formed in a cup-like shape.

The exterior of the inner container 11 is covered by a sleeve 12 which is made of a paper substrate having a stiffness and a heat insulating performance higher than those of the inner container 11. The sleeve 12 has a tubular shape and is adapted so as to hold the inner container 11 and to provide heat insulation for preventing conduction of heat between the liquid food held in the inner container 11 and outside air. In order to increase the stiffness of the sleeve 12, the upper and lower ends thereof are folded inward, and the lower portion thereof is curved toward the center of the packaging container.

While the sleeve 12 is being formed, vertical sealing is performed using a sky diving & hemming, a fix folding strip, or a like method, such that opposite ends are fused so as to form a joint, in a state in which opposite ends of the gas barrier layer are brought sufficiently near each other.

The inner container 11 and the sleeve 12 form a double-wall structure. In the present embodiment, the sleeve 12 is formed first. Subsequently, the inner container 11 is formed within the sleeve 12 using the forward-end expansion method. The inner container 11 is sealed with a lid 13 after being filled with liquid food. The sleeve 12 functions as a structural material for increasing the stiffness of the inner container 11. The use of the sleeve 12 allows the wall thickness of the inner container 11 to be decreased, thereby facilitating the forming process using the forward-end expansion method.

The exterior of the sleeve 12 is covered in advance by a film 16. Predetermined letters and a drawing are printed on the reverse face of the film 16. The film 16 is formed of a laminated film. The outermost layer of the film 16, which contacts the inner container 11 when the upper and lower ends of the sleeve 12 are folded inward, is made of a resin compatible with a resin of the outermost layer of the laminated sheet constituting the inner container 11. In the present embodiment, when the laminated sheet is formed into a cup-like shape, the outermost layer of the laminated sheet is the PP layer thereof. Also, the outermost layer of the laminated film constituting the film 16 is its PP layer.

After the inner container 11 is formed within the sleeve 12, it is possible to cover the surface of the film 16 with a stretched PP film by using a thermal shrinkage method.

When the inner container 11 is formed using the front-end expansion method, the laminated sheet is heated to a temperature of approximately 180° C., which is higher than the melting point. Subsequently, the upper and lower ends of the sleeve 12 are folded inward. Thus, the PP layer of the film 16 and the PP layer of the laminated sheet contact each other. Accordingly, the inner container 11 and the sleeve 12 are fused and joined by heat applied to the inner container 11 during the formation of the inner container 11. In the present embodiment, a description is given of the case where each of the film 16 and the laminated sheet has a PP layer. However, the PP layer may be replaced with a polyethylene (hereinafter referred to as "PE") layer. Even in this case, sufficient compatibility can be obtained, so that a similar effect is provided.

Further, in the forward-end expansion method, when the inner container 11 is formed, the laminated sheet is held by a male die and a female die. Therefore, the inner container 11 is formed to have a larger thickness at the flange portion 11b and its neighboring portion. In this case, since the flange portion 11b and its neighboring portion contact the film 16 while keeping a considerable amount of heat therein, a sufficient amount of heat is applied to the film 16, so that the surface of the film 16 is thermally activated, thereby promoting the fusion between the inner container 11 and the sleeve 12.

The bottom wall of the inner container 11, which is not reinforced by the sleeve 12, is formed to have a thickness larger than that of the body portion 11a. Further, since the lower end of the sleeve 12 is curved radially inward, the thickness of the inner container 11 at the corner portion between the bottom wall and the body portion 11a thereof can be prevented from decreasing.

In this case, since the corner portion and its neighboring portion contact the film 16 while keeping a considerable amount of heat therein, a sufficient amount of heat is applied to the film 16, so that the surface of the film 16 is thermally activated, thereby promoting the fusion performance between the inner container 11 and the sleeve 12.

As described above, by increasing the thickness of the inner container 11 at portions corresponding to the upper and lower ends of the sleeve 12, the inner container 11 and the sleeve 12 can be fused and joined in an improved manner. This increases not only the stiffness of the packaging container but also the durability thereof. In addition, it becomes unnecessary to interpose a thermally activatable adhesive or the like between the inner container 11 and the sleeve 12, or to apply a thermally activatable adhesive or the like onto the inner surface of the sleeve 12.

In an area between the upper and lower ends of the sleeve 12, since the paper substrate and the outermost layer of the inner container 11 contact each other, the inner container 11 and the sleeve 12 are maintained separated from each other, without being joined through fusion. Accordingly, a pressure drop occurring upon cooling of a hot liquid food charged in the packaging container is absorbed by deformation of the inner container 11 only, thereby preventing the sleeve 12 from deforming. As a result, it becomes possible to set the strength of the sleeve 12 to the minimum value required for transportation or use of the packaging container. This makes it possible to reduce costs by decreasing the wall thickness of the packaging container. Moreover, storage, handling and the like of the sleeve 12 become easier.

Next, a description will be given of the lid 13, which is fixed to the upper surface of the flange portion 11b after the liquid food is charged into the inner container 11.

The lid 13 is made of a transparent resin film having a high gas barrier performance, and is fixed to the flange portion 11b through fusion by fusing means such as heat sealing and ultrasonic sealing. Since the resin film is transparent, the liquid food held in the inner container 11 can be seen from the outside.

The resin film is formed to have a thickness of 30–50 $\mu$m, using a co-extrusion method, a blown film forming method, or the like. A resin film formed using the co-extrusion method has the following structure, for example:
PP layer/adhesive layer/EVOH layer/adhesive layer/PP layer.

The lid 13 may be made of a transparent resin plate having a high gas barrier performance. The resin plate is formed using a heat press method or an injection molding method.

A spout 13a is formed in the lid 13 at a predetermined position for pouring the liquid food out of the inner container 11, and is sealed by a pull tab 15. The pull tub 15 is made of a material having a high gas barrier performance, a high stiffness, and a high tensile strength, and may be colored.

The pull tub 15 has the following layered structure, for example:
biaxially stretched PP layer/peelable adhesive layer.

As described above, since the packaging container can be made from resins and a paper substrate, it becomes easier to crush the packaging container after being thrown away, and to recycle the packaging container.

Further, since the packaging container can be directly heated by dielectric heating in the case where liquid food held in the packaging container is heated in a vending machine before being sold, the time required to heat the liquid food to a sufficient temperature can be shortened. Moreover, since the thermal insulating performance can be increased through use of a paper substrate, the packaging container can be held by hand even immediately after being taken out from a vending machine, and the liquid food held therein is prevented from quickly getting cold. In addition, it is possible to prevent heat, which is applied to the laminated sheet during the formation of the inner container by the forward-end expansion method, from escaping to the forming die.

In the case where a laminated sheet having a structure in which the EVOH layer is sandwiched by the PP layers is used as a material for the inner container 11, as in the present embodiment, the laminated sheet can be supported by the EVOH layer because the melting point of EVOH is higher than that of PP. Accordingly, the laminated sheet can be heated to a higher temperature. Further, since the inner container 11 is formed in a state in which it holds a greater amount of heat, the inner container 11 and the sleeve 12 can be fused and joined together in an improved manner.

The bottom wall of the inner container 11, which is not reinforced by the sleeve 12, is formed to have a thickness larger than that of the body portion 11a. Since the gas barrier performance of the inner container 11 must be maintained at a predetermined level at the thinnest body portion 11a of the inner container 11, the thickness of the EVOH layer unnecessarily increases at the bottom wall, which is formed to have a relatively large thickness. Thus, the cost of the packaging container increases accordingly.

Therefore, the film 16 has an EVOH layer serving as a gas barrier so as to improve the gag barrier performance. The film 16 is formed using a co-extrusion method, for example, and has the following layered structure:
PP layer/EVOH layer/PP layer;
PP layer/adhesive layer/EVOH layer/adhesive layer/PP layer.

As described above, since the film 16 has an EVOH layer and therefore has gas barrier performance, the thickness of the EVOH layer of the laminated sheet constituting the inner container 11 can be decreased. That is, when the film 16 has no EVOH layer, it is required that the ratio of the EVOH layer within the laminated sheet constituting the inner container 11 be 14% and that the thickness of the EVOH layer be approximately 20 $\mu$m. In contrast, in the present embodiment, the ratio of the EVOH layer within the laminated sheet constituting the inner container 11 can be decreased to 7% and the thickness of the EVOH layer can be decreased to approximately 10 $\mu$m. Accordingly, the cost of the packaging container can be reduced.

Further, since the upper and lower ends of the sleeve 12 are folded inward so that the film 16 contacts the inner container 11, the EVOH layer of the inner container 11 and the EVOH layer of the film 16 are connected together, whereby a gas barrier layer is formed which extends throughout the packaging container.

When the EVOH layer of the laminated film constituting the film 16 is designed to have a thickness of 10 $\mu$m, the total thickness of the EVOH layer of the laminated film constituting the film 16 and the EVOH layer of the laminated sheet constituting the inner container 11 becomes 20 $\mu$m. Accordingly, the overall gas barrier performance of the packaging container does not decrease.

The gas barrier performance of each EVOH layer tends to decrease as the humidity increases. However, since the EVOH layer of the laminated film constituting the film 16 is disposed at a position separated from the liquid food held in the packaging container, the gas barrier performance does not decrease.

Moreover, since the layered structure including the film 16 and the paper substrate can be formed by bonding the film 16 to the paper substrate, a process step for thermal forming becomes unnecessary.

Accordingly, a biaxially stretched EVOH film can be further applied over the surface of the film 16. This makes it possible to further decrease the thickness of the EVOH layer and to increase the gas barrier performance.

For example, a polyethylene terephthalate (PET) film on which SiOx has been deposited by vacuum deposition may be used. This provides more stable gas barrier performance which is not affected by variations in humidity and the like.

The following method may also be employed. A PE film is bonded to a paper substrate in advance, and the film 16 is then heated and pressed against them so as to bond the film 16 to them. In this case, the film 16 is formed using a co-extrusion process, for example, and has the following layered structure:
PE layer/EVOH layer/PP layer;
PE layer/adhesive layer/EVOH layer/adhesive layer/PP layer.

By the way, a large portion (approximately 50%) of the materials becomes waste due to trimming when packaging containers of the above-described type are manufactured. Therefore, such waste is collected as a recycle material. This recycle material is crushed and returned to a processing step for co-extrusion where the recycle material is reused. In this case, the laminated sheet constituting the inner container 11 has a recycled PP layer (scrap layer). That is, the laminated sheet has the following layered structure:
PP layer/adhesive layer/EVOH layer/adhesive layer/recycled PP layer;
PP layer/recycled PP layer/adhesive layer/EVOH layer/adhesive layer/recycled PP layer/PP layer;
PP layer/recycled PP layer/adhesive layer/EVOH layer/adhesive layer/APET layer.

However, when the content of EVOH in the waste is excessive, extrusion during co-extrusion molding becomes instable.

To overcome this problem, a few % of extrusion stabilizer is added to the recycle material, conventionally. When extrusion becomes instable even after the addition of the stabilizer, PP is added as a virgin material so as to lower the apparent content of EVOH.

For example, when the film 16 has no EVOH layer, the ratio of the EVOH layer of the laminated sheet constituting the inner container 11 is set to 14%. When a recycle material containing such amount of EVOH is used, 51% of an extrusion stabilizer and 35% of PP must be added to the recycle material (65%) so as to stabilize the extrusion.

In contrast, in the present embodiment, the ratio of the EVOH layer of the laminated sheet constituting the inner container 11 is set to 7%. Therefore, the extrusion can be stabilized by adding only 5% of an extrusion stabilizer to the recycle material. Accordingly, it becomes unnecessary to add PP to the recycle material.

Next, a description will be given of the forward-end expansion method.

Figure 6:
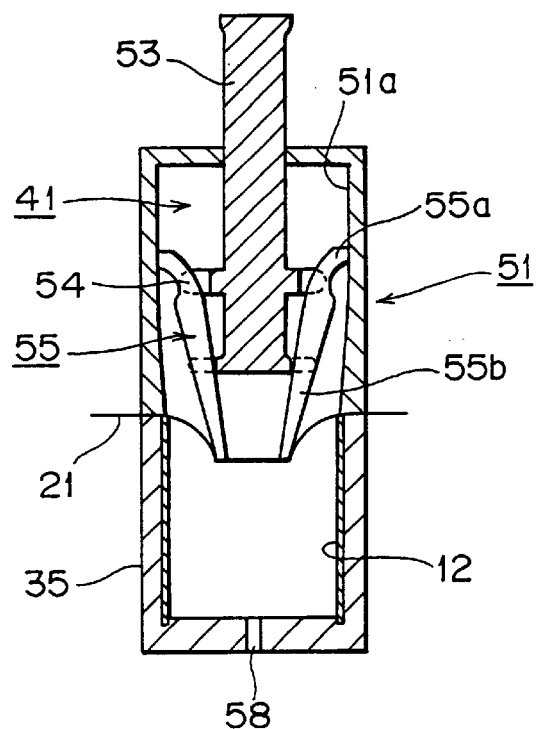
FIG. 6 is a view showing a first step of a method for forming packaging containers according to the first embodiment of the present invention.
Figure 7:
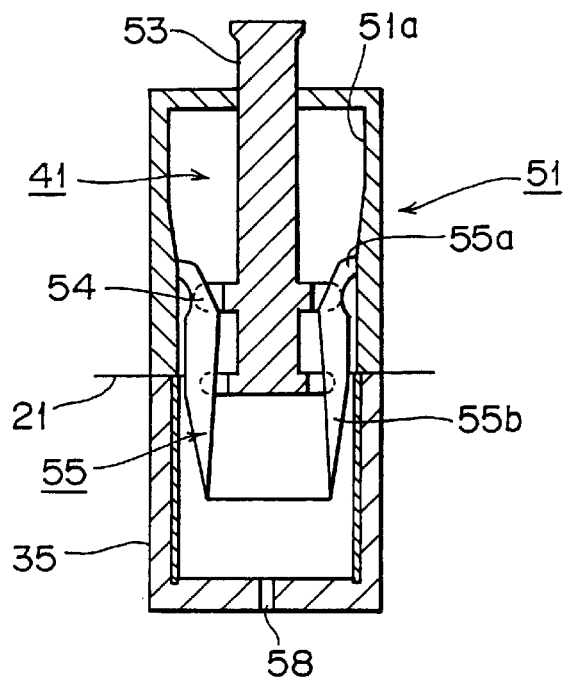
FIG. 7 is a view showing a second step of the method for forming packaging containers according to the first embodiment of the present invention.
Figure 8:
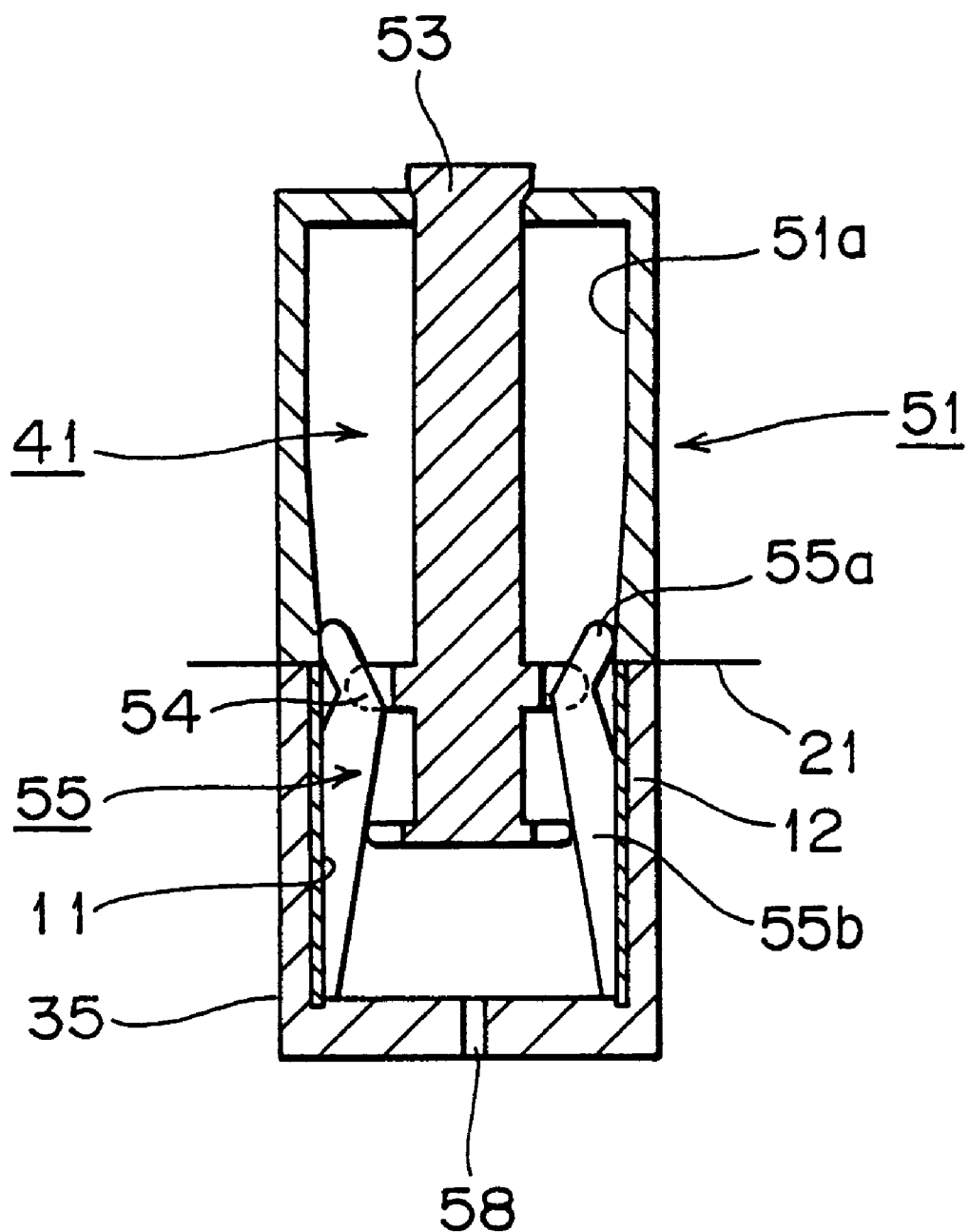
FIG. 8 is a view showing a third step of the method for forming packaging containers according to the first embodiment of the present invention.

FIG. 6 is a view showing a first step of a method for forming packaging containers according to the first embodiment of the present invention, FIG. 7 is a view showing a second step of the method for forming packaging containers according to the first embodiment of the present invention, and FIG. 8 is a view showing a third step of the method for forming packaging containers according to the first embodiment of the present invention.

In these drawings, numeral 12 denotes a sleeve, numeral 21 denotes a laminated sheet, numeral 35 denotes a female die, and numeral 41 denotes a forward-end expansion plug. The forward-end expansion plug 41 is disposed facing the female die 35, and comprises a cylindrical expansion cam 51 having a bottom and an opening facing the female die35, a rod 53 disposed for vertical movement at the center of the forward-end expansion plug 41, and cam blades 55 attached to the forward-end of the rod 53 for pivoting movement about the support points 54. The cam blades 55 are disposed along the periphery edge of the rod 53, and each blade 55 is composed of a cam following portion 55a located on the upward side of the support point 54 and an extending portion 55b located on the downward side of the support point 54. The sleeve 12 is inserted into the female die 35 in advance.

On the inner surface of the expansion cam 51, a cam surface 51a is formed such that the diameter of the cam surface 51a is gradually reduced toward the lower end. Accordingly, when the rod 53 is lowered, as shown in FIG. 7, the cam following portions 55a of the cam blades 55 are moved along the expansion cam 51 and are gradually displaced in radially inward directions, so that the cam blades 55 pivot. As a result, the forward ends of the expanding portions 55b are moved in radially outward directions as the cam blades 55 pivot. During this operation, a vacuum is created in the interior of the female die 35 by evacuating air therefrom through a hole 58 formed in the female die 35.

In this manner, as shown in FIG. 8, an inner container 11 is formed which is well balanced in wall thickness, and has a bottom wall and a body portion 11a (FIG. 2) which are both thin and uniform. In addition, the inner container 11 can be made lighter, and the air tightness can be increased.

Next, a second embodiment of the present invention will be described.

Figure 9:
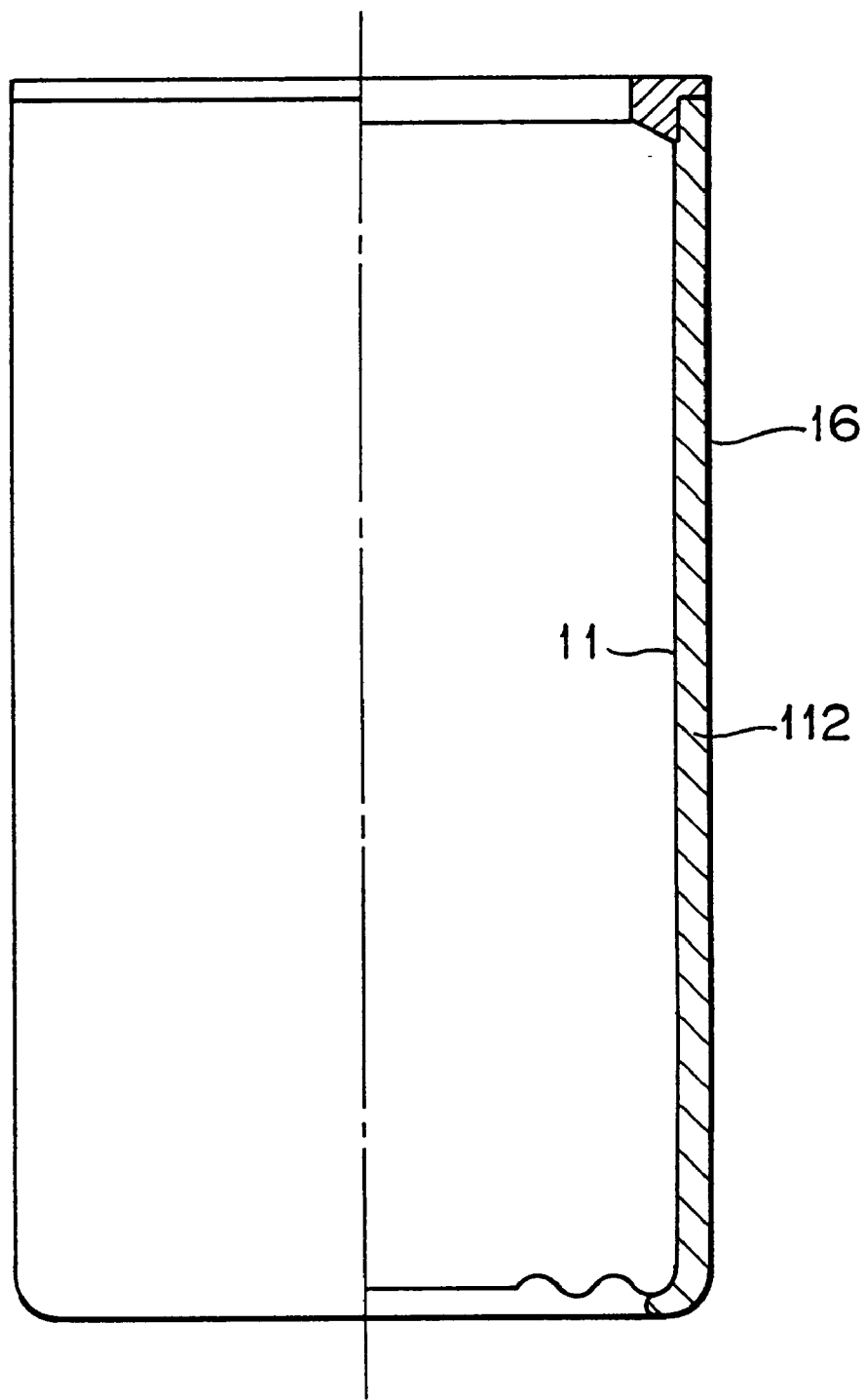
FIG. 9 is a partially sectioned view of a packaging container according to a second embodiment of the present invention.
Figure 10:
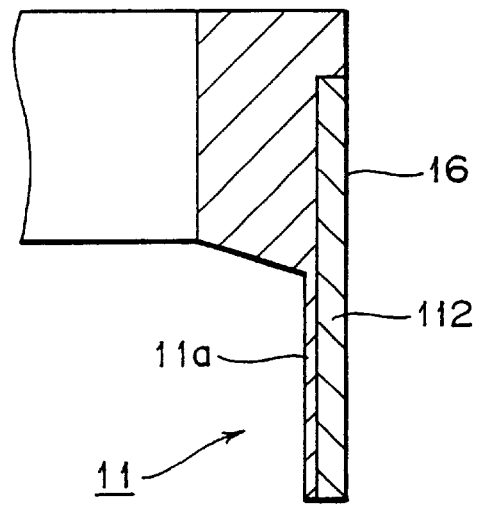
FIG. 10 is a sectional view of the flange portion and its neighboring portion of the packaging container according to the second embodiment of the present invention.
Figure 11:
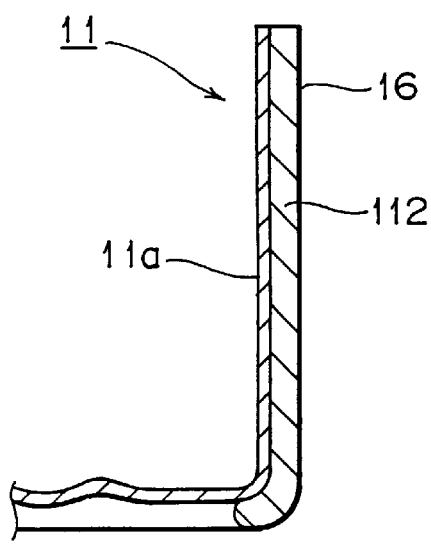
FIG. 11 is a sectional view of the bottom portion and its neighboring portion of the packaging container according to the second embodiment of the present invention.

FIG. 9 is a partially sectioned view of a packaging container according to a second embodiment of the present invention, FIG. 10 is a sectional view of the flange portion and its neighboring portion of the packaging container according to the second embodiment of the present invention, and FIG. 11 is a sectional view of the bottom portion and its neighboring portion of the packaging container according to the second embodiment of the present invention.

In these drawings, numeral 11 denotes an inner container, and numeral 112 denotes a sleeve. The sleeve 112 has a tubular shape and is adapted so as to hold the shape of the inner container 11 and to provide heat insulation for preventing conduction of heat between the liquid food held in the inner container 11 and outside air.

The sleeve 112 is made of foamed PP, and the diameter of bubbles formed by a foaming process is set to approximately 150 μm. In stead of foamed PP, a layered structure comprising a PP layer and a foamed PP layer can be employed. In this case, the foamed PP layer is disposed on the side contacting the inner container 11.

To form the sleeve 112 in a cylindrical shape, an unillustrated blank sheet, which is made of foamed PP and cut into a predetermined size, is wound around a mandrel, and a sealing in a vertical direction is performed using a fusing method such as ultrasonic sealing. In the present embodiment, a blank sheet having a thickness of 0.8 mm and made of foamed PP is used.

The inner container 11 and the sleeve 112 form a double-wall structure. In the present embodiment, the sleeve 112 is formed first. Subsequently, the inner container 11 is formed within the sleeve 112 using the forward-end expansion method. The inner container 11 is sealed with a lid 13 (FIG. 2) after being filled with liquid food. The sleeve 112 functions as a structural material for increasing the stiffness of the inner container 11. The use of the sleeve 112 allows the wall thickness of the inner container 11 to be decreased, thereby facilitating the forming process using the forward-end expansion method.

The exterior of the sleeve 112 is covered in advance by a film 16. Predetermined letters and a drawing are printed on the reverse face of the film 16.

When the inner container 11 is formed using the front-end expansion method, the laminated sheet is heated to a temperature of approximately 180° C., which is higher than the melting point. When the laminated sheet is formed into a cup-like shape, a PP layer or recycled PP layer becomes its outermost layer. The surface of the sleeve 112, which contacts the inner container 11, is made of foamed PP. Accordingly, heat applied to the inner container 11 during the forming process fuses thin walls of foam cells of the foamed PP, thereby the inner container 11 and the sleeve 112 are fused and joined.

As described above, the surface of the sleeve 112 contacting the inner container 11 is made of a foamed resin compatible with the resin which constitutes the outermost layer of the laminated sheet when being shaped into a cup-like shape. This facilitates the integral fusion between the inner container 11 and the sleeve 112 during the formation of the inner container 11.

Accordingly, it be comes unnecessary to interpose thermally activatable adhesive or the like between the inner container 11 and the sleeve 112.

The bottom wall of the inner container 11 which is not reinforced by the sleeve 112, is formed to have a thickness larger than that of the body portion 11a. Since the gas barrier performance of the inner container 11 must be maintained at a predetermined level at the thinnest body portion 11a of the inner container 11, the thickness of the EVOH layer unnecessarily increased at the bottom wall, which is formed to have a relatively large thickness. Thus, the cost of the packaging container increases accordingly.

Therefore, the film 16 has an EVOH layer serving as a gas barrier layer so as to improve the gas barrier performance, and is formed using a co-extrusion method, for example.

In this case, the EVOH layer of the inner container 11 and the EVOH layer of the film 16 are not connected. However, when the thickness of the inner container 11 is increased at portions corresponding to the upper and lower ends of the sleeve 112, the overall gas barrier performance of the packaging container does not decrease.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to packaging containers for holding foods such as milk and soft drink, and packaging container manufacturing apparatuses for manufacturing such packaging containers.

We claim:

1. A packaging containing comprising:
   (a) a sleeve having upper and lower ends folded inward to form folded portions;
   (b) a film which covers said sleeve;
   (c) an inner container formed inside said sleeve; and
   (d) a lid for sealing said inner container;
   (e) in which said film and said inner container are fused directly together and joined only at said folded portions of the upper and lower ends of said sleeve with a cylindrical portion of said inner container and a cylindrical portion of said sleeve, unbonded to the cylindrical portion of said inner container, separating said folded portions.

2. A packaging container according to claim 1, in which said film is formed of a laminated film having a gas barrier layer.

3. A packaging container according to claim 1, in which said inner container is formed of a laminated sheet having a gas barrier layer.

4. A packaging container according to claim 1, in which
(a) said film is formed of a laminated film having a gas barrier layer;
(b) said inner container is formed of a laminated sheet having a gas barrier layer; and
(c) the outermost layer of said laminated film is made of a resin compatible with a resin constituting the outermost layer of said laminated sheet.

5. A packaging container according to claim 4, in which
(a) the resin constituting the outermost layer of said laminated sheet and the outermost layer of said laminated film is polypropylene; and
(b) the resin constituting the gas barrier layer of said laminated sheet and the gas barrier layer of said laminated film is ethylene vinyl alcohol copolymer.

6. A packaging container according to claim 1 wherein said sleeve is formed of a thermal insulating material.

7. A packaging container according to claim 6 wherein said thermal insulating material comprises paper.

8. A packaging container comprising:
(a) a resin sleeve in the form of a tube having opposing open ends;
(b) a film which covers said sleeve;
(c) an inner container formed inside said sleeve, said inner container having a cylindrical portion, a closed bottom formed integral with said cylindrical portion and an open top;
(d) a lid for sealing closed said open top of said inner container;
(e) in which said sleeve and said inner container are fused directly together and thereby joined integrally.

9. A packaging container according to claim 8, in which
(a) said film is formed of a laminated film having a gas barrier layer;
(b) said inner container is formed of a laminated sheet having a gas barrier layer; and
(c) said sleeve is made of a foamed resin compatible with a resin constituting the outermost layer of said laminated sheet.

10. A packaging container according to claim 9, in which
(a) the resin constituting the outermost layer of said laminated sheet and the outermost layer of said laminated film is polypropylene; and
(b) the resin constituting the gas barrier layer of said laminated sheet and the gas barrier layer of said laminated film is ethylene vinyl alcohol copolymer.

11. A packaging container according to claim 8, in which said film is formed of a laminated film having a gas barrier layer.

12. A packaging container according to claim 8, in which said inner container is formed of a laminated sheet having a gas barrier layer.

* * * * *

UNITED STATES PATENT AND TRADEMARK OFFICE
CERTIFICATE OF CORRECTION

PATENT NO. : 5,954,217
DATED : September 21, 1999
INVENTOR(S) : BRKOVIC et al

It is certified that error appears in the above-identified patent and that said Letters Patent is hereby corrected as shown below:

<u>On the face of the Patent</u>, under the heading "References Cited," the date "9/1968" should read --7/1966--.

Col. 10, line 36, "51%" should be replaced with --5%--.

Signed and Sealed this

Tenth Day of April, 2001

Attest:

NICHOLAS P. GODICI

Attesting Officer     Acting Director of the United States Patent and Trademark Office